(12) United States Patent
Dishman et al.

(10) Patent No.: US 7,979,727 B2
(45) Date of Patent: Jul. 12, 2011

(54) APPARATUS, SYSTEM, AND METHOD FOR AN INTEGRATED POWER SUPPLY EFFICIENT IN HIGH AND LOW POWER CONDITIONS

(75) Inventors: Cecil C. Dishman, Raleigh, NC (US); Randhir S. Malik, Cary, NC (US); Trung M. Nguyen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 11/966,512

(22) Filed: Dec. 28, 2007

(65) Prior Publication Data

US 2009/0172453 A1 Jul. 2, 2009

(51) Int. Cl.
*G06F 11/30* (2006.01)
(52) U.S. Cl. .......................... 713/324; 713/320; 713/340
(58) Field of Classification Search .................. 713/300, 713/310, 320, 330, 340, 323–324
See application file for complete search history.

(56) References Cited

U.S. PATENT DOCUMENTS

| | | | |
|---|---|---|---|
| 4,864,483 A | 9/1989 | Divan | 363/37 |
| 6,031,747 A | 2/2000 | Ilic et al. | 363/71 |
| 6,400,583 B1 | 6/2002 | Lau | 363/21.13 |
| 6,631,082 B2 | 10/2003 | Birumachi | 363/97 |
| 6,934,786 B2* | 8/2005 | Irving et al. | 710/300 |
| 6,950,895 B2* | 9/2005 | Bottom | 710/301 |
| 7,158,391 B2* | 1/2007 | Hatakeyama | 363/21.01 |
| 7,391,194 B2* | 6/2008 | Brown | 323/283 |
| 7,761,718 B2* | 7/2010 | Yasuo et al. | 713/300 |
| 2003/0095421 A1 | 5/2003 | Kadatskyy et al. | 363/65 |
| 2007/0186120 A1* | 8/2007 | Yasuo et al. | 713/300 |
| 2008/0104300 A1* | 5/2008 | Diener et al. | 710/303 |

FOREIGN PATENT DOCUMENTS

JP 2006230053 8/2006

* cited by examiner

*Primary Examiner* — Raymond N Phan
(74) *Attorney, Agent, or Firm* — Kunzler Needham Massey & Thorpe (57) ABSTRACT

An apparatus, system, and method are disclosed for a power supply that is efficient in both high and low power conditions. An integrated power supply regulates current on a regulated bus to maintain a regulated bus voltage under varying load conditions. The integrated power supply includes a first power supply rated to provide full load power to the load and second power supply rated to provide power at levels below a minimum power threshold. The second power supply includes switching elements that have lower switching losses than switching elements of the first power supply. A sensing module measures power. A switching module starts up the second power supply and shuts down the first power supply if the measured power falls below the minimum power threshold, and starts up the first power supply and shuts down the second power supply if the measured power rises above the minimum power threshold.

17 Claims, 5 Drawing Sheets

APPARATUS, SYSTEM, AND METHOD FOR AN INTEGRATED POWER SUPPLY EFFICIENT IN HIGH AND LOW POWER CONDITIONS

BACKGROUND OF THE INVENTION

1. Field of the Invention

This invention relates to power supplies, and more particularly relates to integrating two or more power supplies to work together to provide increased efficiency to a load at high and low power levels.

2. Description of the Related Art

A power supply, sometimes known as a power supply unit or PSU, is a device or system that supplies electrical or other types of energy to an output load or group of loads. A power supply, in some embodiments may be configured to convert power in one form to another form, such as converting alternating current ("AC") power to direct current ("DC") power. The regulation of power supplies is typically accomplished by incorporating circuitry to tightly control the output voltage or current of the power supply to a specific value or very small range of specific values. The specific value is closely maintained despite variations in the load presented to the power supply's output, or any reasonable voltage variation at the power supply's input.

For example, in an electrical device such as a computer, the power supply is typically designed to convert an AC voltage input, such as is traditionally provided by a conventional wall socket, into several low-voltage DC power outputs for transmission to the internal components of the computer. Conversion is sometimes performed in stages that may include different power supply topologies such as a rectification stage, a boost stage, buck stage, or other topology.

Circuitry typically associated with power supplies relies on switching elements which are turned on and off at a fixed switching rate to maintain the output voltage. For example, if a switching rate is 100 kilo-Hertz ("kHz"), the switching period is 10 micro seconds. Duty cycle is typically a ratio of an amount of time a switch is commanded on during a switching period divided by the switching period. If a switch is commanded on for 5 microseconds of a 10 microsecond switching period, the duty cycle is 5 microseconds divided by 10 microseconds or 0.5. The minimum duty cycle is 0 and the maximum duty cycle is 1.0.

Power supplies cannot convert all of the energy drawn from a source to another form without some dissipation of energy within the power supply. Typically components within the power supply dissipate some heat due to parasitic resistance, inductance, and capacitance. Efficiency is a measure of energy dissipation within a power supply and is typically expressed as a ratio of power supplied to a load from the power supply divided by input power received by the power supply. Often efficiency is not uniform across an entire range of power that can be provided by a power supply. Typically, efficiency of a power supply drops as the power supply becomes lightly loaded. Often this is due to switching losses in switching elements within a power supply.

Low efficiency is undesirable because energy is wasted and power dissipated in a power supply is usually transformed to heat that can damage components and requires cooling. In order to improve efficiency of power supplies, and thus reduce wasted energy, the Environmental Protection Agency ("EPA") is in the process of implementing standards that will require all power supplies to meet at least 80% efficiency when operating at 20%, 50%, and 100% of full load capacity of a power supply. The conventional art does not address this problem or provide a means whereby the power supplies can operate efficiently enough to meet EPA standards.

SUMMARY OF THE INVENTION

From the foregoing discussion, it should be apparent that a need exists for an apparatus, system, and method for an integrated power supply that supplies efficient power to a load in both heavy and light load conditions. Beneficially, such a system, apparatus, and method would allow a power supply to meet EPA Energy Star standards. The present invention has been developed in response to the present state of the art, and in particular, in response to the problems and needs in the art that have not yet been fully solved by currently available methods to increase efficiency in power supplies. Accordingly, the present invention has been developed to provide an apparatus, system, and method to provide efficient power in heavy and light load conditions that overcome many or all of the above-discussed shortcomings in the art.

The apparatus to provide efficient power to a load includes an integrated power supply provided with a plurality of modules configured to functionally execute the necessary steps of sensing the power consumed by a load, and switching between the first and second power supplies as necessary to optimize efficiency by minimizing power dissipation. The apparatus includes an integrated power supply that regulates voltage on a regulated bus. The regulated bus provides power to a load. The integrated power supply includes a first power supply that provides power to the regulated bus. The first power supply includes components rated to provide full load power to the load.

The integrated power supply also includes a second power supply that provides power to the regulated bus. The second power supply includes switching elements that have lower switching losses than switching elements of the first power supply. The second power supply is capable of providing power to the load at a power level below a minimum power threshold. The apparatus includes a sensing module that measures power. The apparatus includes a switching module that starts up the second power supply and shuts down the first power supply in response to the measured power falling below the minimum power threshold. The switching module also starts up the first power supply and shuts down the second power supply in response to the measured power rising above the minimum power threshold.

The apparatus, in one embodiment, includes an internal bus and the first power supply and the second power supply each include a primary stage and a regulator stage. When the first power supply is operational, the primary stage of the first power supply regulates voltage of the internal bus. The internal bus serves as an input to the regulator stage of the first power supply and the regulator stage of the first power supply regulates the voltage on the regulated bus. When the second power supply is operational, the primary stage of the second power supply regulates voltage of the internal bus that serves as an input to the regulator stage of the second power supply and the regulator stage of the second power supply regulates the voltage on the regulated bus.

The apparatus is further configured, in one embodiment, so that the primary stage of the first power supply and of the second power supply each comprise a boost converter that regulates the internal bus to a voltage greater than an input voltage provided to the integrated power supply. In the embodiment, the regulator stage of the first power supply and the second power supply each comprise a buck-type converter that regulates the regulated bus to a value lower than the internal bus. In a further embodiment, the primary stage of the apparatus comprises an active power factor correction stage.

In one embodiment, parasitic capacitance of the switching elements of the second power supply is less than parasitic capacitance of the switching elements of the first power supply. In a further embodiment, the apparatus is configured so that the parasitic capacitance of the switching elements of the second power supply is at least two thirds less than the parasitic capacitance of the switching elements of the first power supply.

In one embodiment, the sensing module measures power consumed by the load and/or input power to the integrated power supply. In another embodiment, the minimum power threshold comprises a power level above which the first power supply exceeds a minimum allowable efficiency. In another embodiment, the minimum allowable efficiency is above 80%. In yet another embodiment, efficiency comprises a ratio of power delivered to the load divided by power received by the integrated power supply.

In one embodiment, the minimum power threshold includes an upper limit and a lower limit. In the embodiment, the switching module starts up the second power supply and shuts down the first power supply in response to the sensing module sensing power supplied to the load falling below the lower limit. Also in the embodiment, the switching module starts up the first power supply and shuts down the second power supply in response to the sensing module sensing power supplied to the load rising above the upper limit.

A system of the present invention is also presented to efficiently regulate voltage. The system in the disclosed embodiments substantially includes the steps necessary to carry out the functions presented above with respect to the operation of the described apparatus. In particular, the system, in one embodiment, includes an integrated power supply that regulates voltage on a regulated bus. The regulated bus provides power to a load. The system includes an electronic device that includes the load. The regulated bus is connected between an electronic device and the integrated power supply. The regulated bus delivers power from the integrated power supply to the electronic device.

The integrated power supply includes a first power supply with components rated to provide full load power to the load. The integrated power supply includes a second power supply with switching elements that have lower switching losses than switching elements of the first power supply when the second power supply provides power to the load at a power level below a minimum power threshold. The system includes a sensing module for measuring power at the integrated power supply. The system includes a switching module which starts up the second power supply and shuts down the first power supply when the measured power falls below the minimum power threshold, and starts up the first power supply and shuts down the second power supply when the measured power rises above a second power threshold.

In one embodiment, the system includes a communication bus and a communication module that communicates over the communication bus whether the first power supply or the second power supply is active and the amount of power consumed by the load. In another embodiment, the integrated power supply receives alternating current ("AC") voltage as an input and provides regulated direct current ("DC") voltage as an output. The electrical device, in various embodiments, may comprise a personal computer, a laptop computer, a workstation, an appliance, an application-specific integrated circuit ("ASIC"), a Personal Digital Assistant ("PDA"), a digital music player, and/or a server.

A method of the present invention is also presented for efficiently regulating voltage. The method in the disclosed embodiments substantially includes the steps necessary to carry out the functions presented above with respect to the operation of the described apparatus and system. The method includes measuring power consumed by a load supplied by an integrated power supply that regulates voltage on a regulated bus. The integrated power supply includes a first power supply connected to the regulated bus. The first power supply includes components rated to provide full load power to the load. The integrated power supply includes a second power supply connected to the regulated bus. The second power supply includes switching elements that have lower switching losses than switching elements of the first power supply. The second power supply is capable of providing power to the load at a power level below a minimum power threshold.

The method includes starting up the second power supply and shutting down the first power supply in response to power consumed by the load falling below the minimum power threshold. The method includes starting up the first power supply and shutting down the second power supply in response to the measured power rising above the minimum power threshold.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1A:
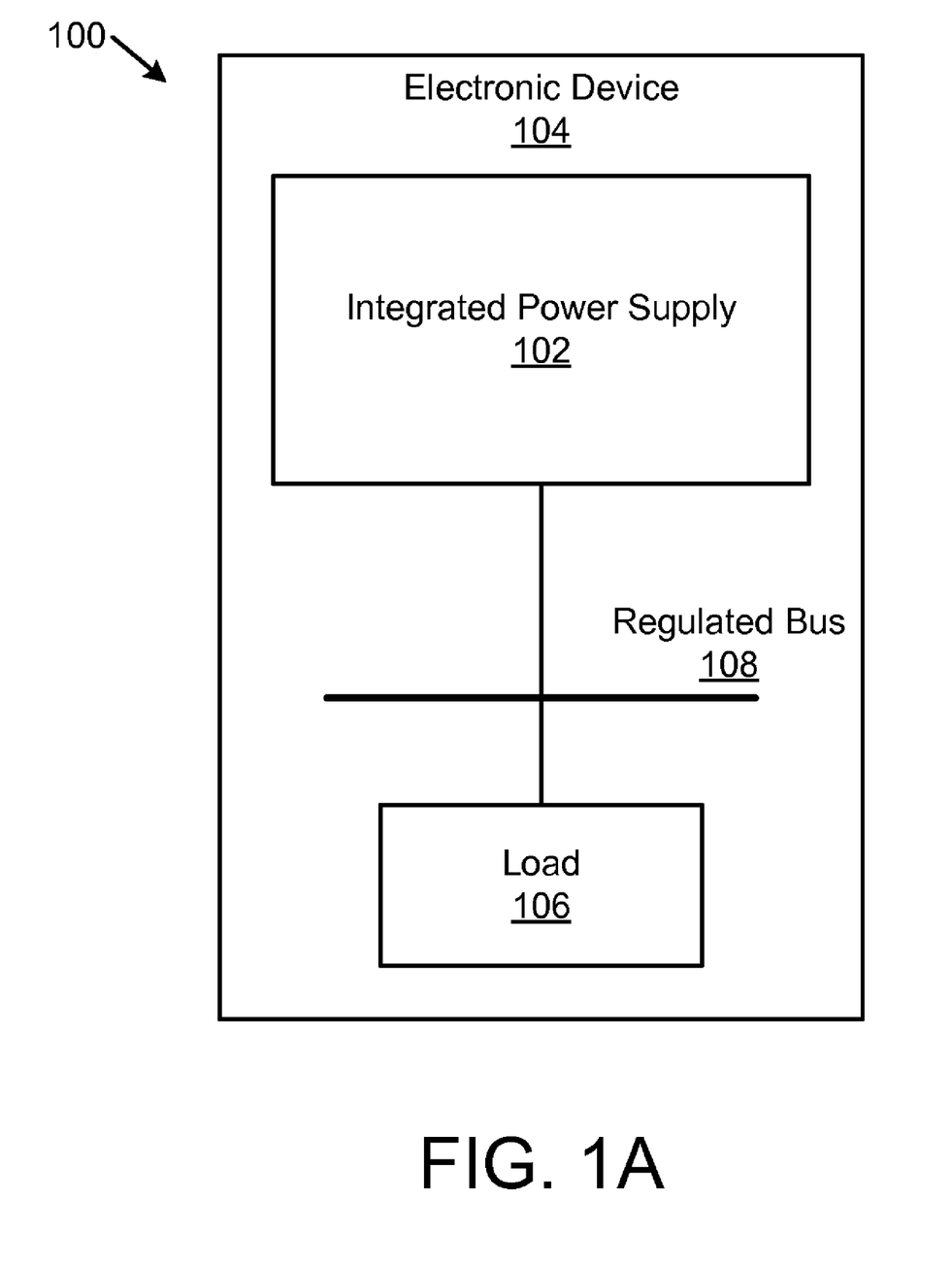
FIG. 1A is a schematic block diagram illustrating one embodiment of a system to supply highly efficient power to a load in both high and low power conditions in accordance with the present invention.

FIG. 1A is a schematic block diagram that depicts one embodiment of a system 100 to supply efficient power to a load in both high and low power conditions in accordance with the present invention. The system 100 includes an integrated power supply 102, an electronic device 104, a load 106, and a regulated bus 108, which are described below.

The integrated power supply 102 provides regulated power to the load 106. The integrated power supply 102 typically receives as input alternating current ("AC") or direct current ("DC") voltage from a utility company, power generator, battery or other device as one of skill in the art will recognize. In some embodiments the integrated power supply 102 may receive input voltage that is fed to an input rectifier and harmonic filter. The integrated power supply 102 is typically connected to the electronic device 104 by a regulated bus 108. The regulated bus 108 of the integrated power supply 102 may be configured to provide one or more different voltages and currents to the electronic device 104. For example, in a typical power supply, voltages of +24 v, +20 v, +12 v, +6 v, +5 v, +3.3 v, and −12 v are commonly provided.

In one embodiment, the integrated power supply 102 may be implemented within the same enclosure as the electronic device 104, such as within a computer tower case. In other embodiments, the integrated power supply 102 may be implemented external to the electronic device 104 and may be connected to the electronic device 104 via a connection means such as a cord, cable or bus such as a blade center.

The electronic device 104 may include various systems and subsystems. The electronic device 104 may be a personal computer, a laptop computer, a workstation, a computer system, an appliance, an application-specific integrated circuit ("ASIC"), a Personal Digital Assistant ("PDA"), a digital music player, a server, a server blade center, a server farm, a router, a switch, an appliance, a motor, an automotive system, an avionics system, or the like. One of skill in the art will recognize other examples of electronic devices that may serve as a load 106 to the integrated power supply 102.

The electronic device 104 causes a load 106 to be applied to the integrated power supply 102. The amount of load 106 may affect the performance and efficiency of the power supply 102. In one embodiment, the load 106 may vary depending on the operation characteristics of the electronic device 104 and the integrated power supply 102 may include switching elements for adjusting the power output characteristics and efficiency of the integrated power supply 102 in response to changes in the load 106. In this manner, the power supply 102 typically regulates the voltage on the regulated bus 108 to provide substantially constant voltage levels to the electronic device 104.

The load 106, in various embodiments, may include one or more electrical devices or systems that receive power from the integrated power supply 102. For example, the load 106 may include electronic devices 104 such as any of those listed above, or it may include sub-systems of a larger system. In further embodiments, the load 106 may include a processor or a hard-disk drive of a computer system. One of skill in the art will recognize other loads 106 that may be supplied by the integrated power supply 102.

The regulated bus 108 is typically a physical electrical interface in which one or more devices share the same electric connection and which regulates a precise voltage level across its components to supply regulated power to the load 106. In some embodiments, the regulated bus 108 may takes the form of an array of wires that terminate at a connector which allows a device to be plugged into the regulated bus 108. In another embodiment, the regulated bus 108 may be a simple connection, or even a cord. In another embodiment the regulated bus 108 may include a bus or integrated circuit. One of skill in the art will recognize other examples of conductors and components which can be used as a regulated bus 108.

Figure 1B:
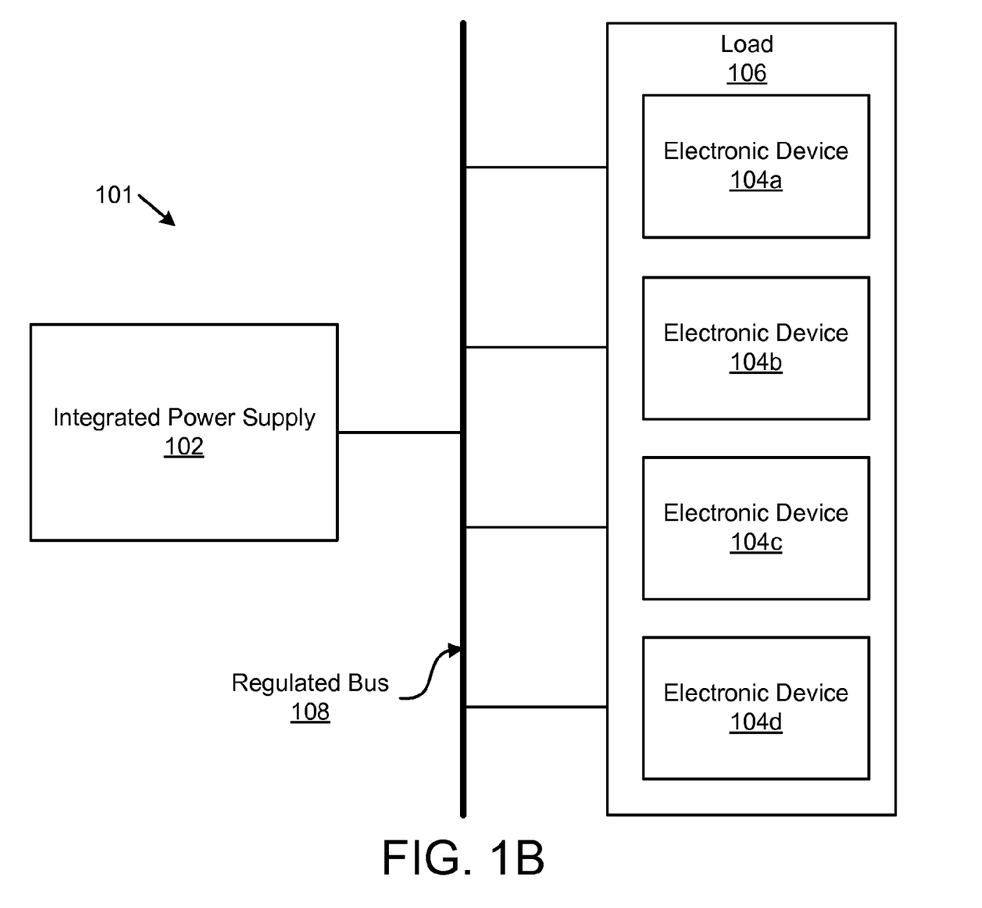
FIG. 1B is a schematic block diagram illustrating another embodiment of a system to supply highly efficient power to a load in both high and low power conditions in accordance with the present invention.

FIG. 1B is a schematic block diagram that depicts one embodiment of a system to supply efficient power to a load that comprises a series of electronic devices, in both high and low power conditions in accordance with the present invention. The system 101 includes an integrated power supply 102, electronic devices 104, a load 106, and a regulated bus 108, which are substantially similar to the system 100 described in relation to FIG. 1A. The system 101 includes two or more electrical devices 104 connected to the regulated bus 108.

The integrated power supply 102 in the system 101 is external to the electronic devices 104a-d. In other embodiments, the integrated power supply 102 may be internal to one of the electronic devices 104, and may supply power to the others via the regulated bus. The regulated bus 104 may be a bus in a blade center and the electronic devices 104 may be blades in the blade center. In another embodiment, the regulated bus 108 includes cables or wires and the electronic devices 104 may be components in a rack or other individual components. One of skill in the art will recognize other configurations of the system 101 with multiple electronic devices connected to the regulated bus 108.

Figure 2:
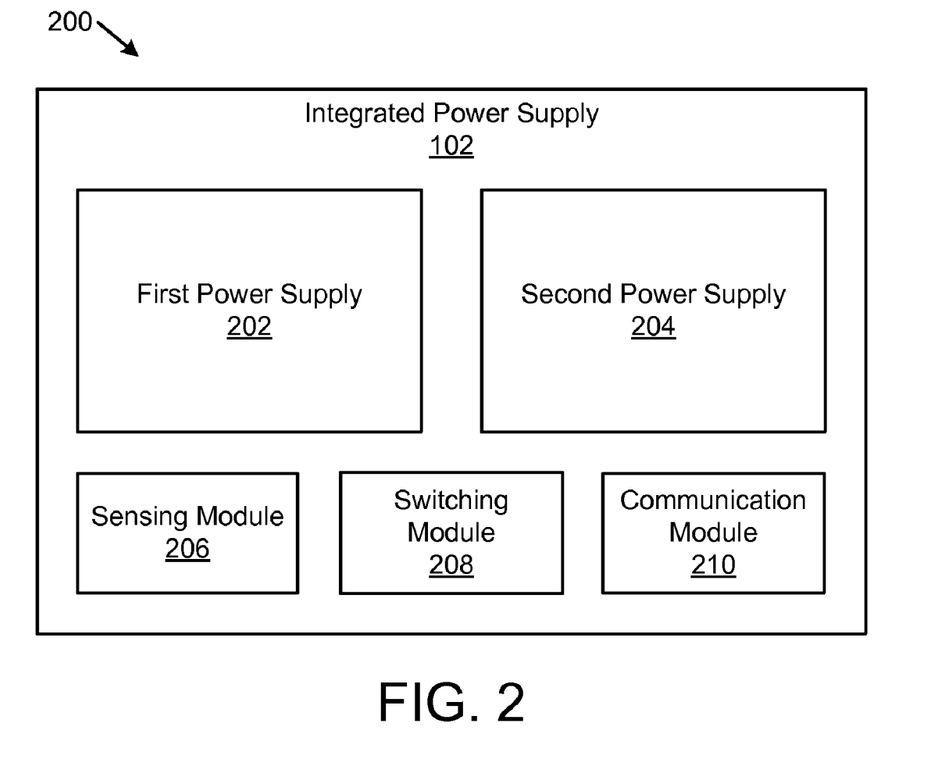
FIG. 2 is a schematic block diagram illustrating an embodiment of an integrated power supply with apparatus for supplying highly efficient power to a load in both high and low power conditions in accordance with the present invention.

FIG. 2 is a schematic block diagram that depicts one embodiment of an apparatus 200 to supply efficient power to a load in both high and low power conditions in accordance with the present invention. The apparatus 200 includes an integrated power supply 102 which is substantially similar as described above in relation to the systems 100, 101 of FIGS. 1A and 1B. In the apparatus 200, the integrated power supply 102 includes a first power supply 202, a second power supply 204, a sensing module 206, a switching module 208, and communication module 210, which are described below.

Both the first power supply 202 and second power supply 204 supply power, in the form of electrical energy, to the load 106 of the electronic device 104 through the regulated bus 108. The electronic device 104, the load 106, and the regulated bus 108 are substantially similar to those described above in relation the systems 100, 101 of FIGS. 1A and 1B. In a preferred embodiment, the first power supply 202 and second power supply 204 are switching power supplies that are interleaved. The first power supply 202 supplies power to the load 106 when power consumed by the load 106 is above a minimum power threshold and the second power supply 204 provides power to the load 106 when the power consumed by the load 106 falls below the minimum power threshold.

The first power supply 202 includes components that are rated to provide full load power to the load 106. The second power supply 202 includes components that are rated to provide power to the load 106 at a power level that is at or below the minimum power threshold. Full load power is typically understood by one of skill in the art as a rated level of power that a power supply 202 can provide to a load without sustaining damage, becoming overly inefficient, etc. Typically, a power supply 202 can operate above the full load rating, but at some point above the rated full load power, the power supply 202 may overheat, components may fail, etc. One of skill in the art will recognize other implications of a full load power rating and how to size components consistent with the full load power rating of the power supply 202.

A power supply is usually most efficient at loads that are close to rated full load power. At lower power levels, efficiency of the power supply 202 starts to be reduced. Often this is because a switching power supply typically operates at a fixed switching frequency. Typically, in switching power supplies such as the first and second power supply 202, 204, switches are turned on at a fixed switching frequency.

For example, if a switching frequency is 100 kilo-Hertz ("kHz"), the switching period is 10 micro seconds. For a particular switching period, in a pulse-width modulated power supply 202, 204, the switching elements within the power supply 202, 204 are closed for a portion of the switching period. The ratio of time a switch is commanded on during a switching period divided by the switching period is the duty cycle. Typically, at light load, the duty cycle may be such that the switch is closed for only a short period of time. Since the switches of a power supply 202, 204 turn on and off once each switching period regardless of duty cycle, power loss due to switching remains constant even at light load. This causes efficiency of the power supply 202, 204 to drop off at light load when switching losses begin to dominate.

Components of the first power supply 202 are rated to handle full load power and may be large and bulky compared to components of a power supply 204 with a lower full load power rating. The size of the components rated for full load often leads to reduced efficiency at light load. For example, switching elements of the first power supply 202, which are typically metal-oxide field effect transistors ("MOSFETs"), often have interelectrode capacitance that slows operation of the switches and causes losses. Switches with lower interelectrode capacitance are typically too small to handle the rated full load power of the first power supply 202.

The second power supply 204 is designed with a lower full load rating. In the apparatus 200, the second power supply 204 is designed to handle power up to at least the minimum power threshold. The minimum power threshold is ideally chosen to be at an efficiency of the first power supply 202 where efficiency starts to be dramatically reduced. For example, if the efficiency of the first power supply 202 starts to be dramatically reduced at 30% load, the minimum power threshold may be 30% of the full load rating of the first power supply 202 and the second power supply 204 is designed to handle at least 30% of the full load rating of the first power supply 202. The minimum power threshold may also be at an arbitrary level or at a power level that has some significance, such as 20% of full load, which is important for complying with the Energy Star requirements.

Preferably, the second power supply 204 includes components that are not rated much above the minimum power threshold. For example, smaller switches in the second power supply 204 may have lower interelectrode capacitance, and thus lower switching loss than switches of the first power supply 202 because they are able to transition from an on state to an off state, and vice versa, faster than larger switches. This enables components to be chosen for the second power supply 204 such that efficiency of the second power supply 204 can be maintained down to maybe 30% of the full load rating of the second power supply 204, or some other point where switching losses dominate efficiency of the second power supply 204 and efficiency starts to be dramatically reduces. This point where efficiency of the second power supply starts to drop off may be somewhere below 10% of the full load rating of the first power supply 202. By operating the first power supply 204 down to the minimum power threshold and the second power supply 204 below the minimum power threshold, the overall efficiency of the integrated power supply 102 is improved at light load.

While interelectrode capacitance of larger switches may be greater than for smaller switches, parasitic resistance of the larger switches may be less than parasitic resistance of the smaller switches. Typically, the reduced switching losses of the smaller switches in the second power supply 204 make up for increased parasitic resistance because the second power supply 204 operates at light load. Capacitance, resistance, and other design parameters may be traded off to realize a second power supply 204 that remains efficient below the minimum power threshold.

In various embodiments, the first and second power supply 202, 204 may be implemented as a boost stage, as a buck stage, or as some other stage including variations of the buck-type topology and boost-type topology as will be recognized of one of skill in the art. The first and second power supply 202, 204 may also include an input rectifier, harmonic filter, a pulse-width modulator, and the like. In another embodiment, the integrated power supply 102 includes three or more interleaved power supplies, including the first and second power supplies 202, 204. A third power supply may be turned on when the second power supply is at light load and efficiency drops off. One of skill in the art will recognize other similar configurations with interleaved power supplies to improve efficiency.

The apparatus 200 includes a sensing module 206 for measuring power. In one embodiment, the sensing module 206 measures power consumed by the load 106. The sensing module 206 may, in various embodiments, sense information about the operation of the integrated power supply 102, such as which power supply 202, 204 within the integrated power supply 102 is active and which power supply 202, 204 is inactive. The sensing module 206 may include a power meter, sensing circuit, etc., which measures the power consumed by the load 106. The sensing module 206 may include transformers, current transformers, voltage dividers, opto-couplers, or the like to measure power. The sensing module 206 may include a clock, such as a piezoelectric crystal, for measuring elapsed time between events, such as when the first power supply 202 or the second power supply 204 starts up or shuts down, or when the load 106 falls to zero or rises above a maximum power rating or the minimum power threshold.

The sensing module 206 may include a thermometer or temperature sensor, such as thermocouple, silicon-bandgap, thermistor, or the like. In one embodiment, the sensing module 206 measures the temperature of the integrated power supply 102 and its individual components. The sensing module 206 communicates power to the switching module 208, and may communicate other parameters, such as temperature, as required to the switching module 208.

In one embodiment, the sensing module 206 may also measure input power to the integrated power supply 102. In the embodiment the minimum power threshold is correlated to the input power instead of to power consumed by the load 106. This embodiment may be used where the input power is correlated to efficiency and may be desirable in cases where input power is measured for some other purpose. Measuring input power may not be as desirable because input power may level out as load reduces due to constant switching losses. In this case, the minimum power threshold may be chosen at a point above where the input power levels off. One of skill in the art will recognize other ways for the sensing module 206 to measure power that can be used to determine when the sensed power crosses a minimum power threshold.

The sensing module 206 may measure input power and output power from the integrated power supply 102 to make an overall power dissipation determination. In another embodiment, the sensing module 206 measures the input and output power of the first power supply 202 and the second power supply 204 to make a power dissipation determination for each power supply 202, 204. One of ordinary skill in the art will recognize other useful data that can be measured by the sensing module 206.

The apparatus 200 includes a switching module 208 that starts up the second power supply 204 within the integrated power supply 102 and shuts down the first power supply 202 within the integrated power supply 102 in response to the measured power from the sensing module 206 falling below a minimum power threshold. The switching module 208 may also start up the first power supply 202 and shut down the second power supply 204 in response to the measured power rising above the minimum power threshold. For example, when the switching module 208 determines that the power to the load 106 falls below the minimum power threshold, the switching module 208 may deactivate a pulse-width modulator controlling the first power supply 202 and may activate a pulse-width modulator controlling the second power supply.

In another embodiment, the integrated power supply includes a single pulse-width modulator and the switching module 208 deactivates signals to the first power supply 202 and activates the second power supply 204. In another embodiment, the switching module 208 deactivates the switches of the first power supply 202 and activates switches of the second power supply 204. The switching module 208 typically takes an opposite action when power to the load 106 increases above the minimum power threshold. One of skill in the art will recognize other ways for the switching module 208 to activate and deactivate the first and second power supplies 202, 204.

The minimum power threshold, in one embodiment, includes an upper limit and a lower limit. The lower limit may be the threshold at which the switching module 208 shuts down the first power supply 202 and starts up the second power supply 204. The upper limit may be the threshold at which the switching module 208 shuts down the second power supply 204 and starts up the first power supply 202. The upper and lower limits thus form a hysteresis band and may be used to prevent chatter caused by switching between the first and second power supplies. Typically, however, power to the load 106 changes slowly with respect to operation of a feedback loop controlling the regulated bus 108 and to a switching frequency of the power supplies 202, 204 so a hysteresis band may not be required.

In various embodiments, the switching module 208 can be configured to start up and shut down the first power supply 202 and the second power supply 204 to provide maximum efficiency to the load 106 in low power conditions. The switching module 208 receives data from the sensing module 206, including, in some embodiments, temperature and power dissipation information. The switching module 208, in some embodiments, contains logic for analyzing data from the sensing module 206 to determine when to start up and shut down the first power supply 202 and the second power supply 204. The logic in the switching module 208 may be pre-programmed or may be programmable. In some embodiments, the integrated power supply 102 may permit an external controller such as a human being or computer to override some, or all, of the efficiency decisions made by the switching module 208.

By starting up and shutting down the first power supply 202 and the second power supply 204, the switching module 208 can disable components within the integrated power supply 102 with high switching losses and enable components with low switching losses. In so doing, the integrated power supply 102 may increase efficiency for light load conditions. Increased efficiency at light load may enable the integrated power supply 102 to pass some efficiency standards, such at Energy Star requirements. For example, the apparatus 200 may enable the integrated power supply 102 to have an efficiency greater than 80% at 20%, 50%, and 100% load.

In one embodiment, the apparatus 200 includes a communication module 210 that communicates information from the sensing module 206 and/or the switching module 208 over a communication bus. The communication module 210 may transmit data to a data collector, which may be a device, a system, an individual, or the like, which is internal or external to the integrated power supply 102. The communication module 210 may convey power data in real time or may store and save the power data in the integrated power supply 102. The power data may be power consumed by the load 106, input power, power consumed by the first and/or second power supply 202, 204, information about which power supply 202, 204 within the integrated power supply 102 is active, information about elapsed time between events, temperature information relating to the integrated power supply 102, and the like. The communication module 210 may communicate with the data collector over a communication bus, wirelessly using a scanner or transceiver, etc. One of skill in the art will recognize other types of power data that may be stored and conveyed by the communication module 210, and various methods of conveying such information.

Figure 3:
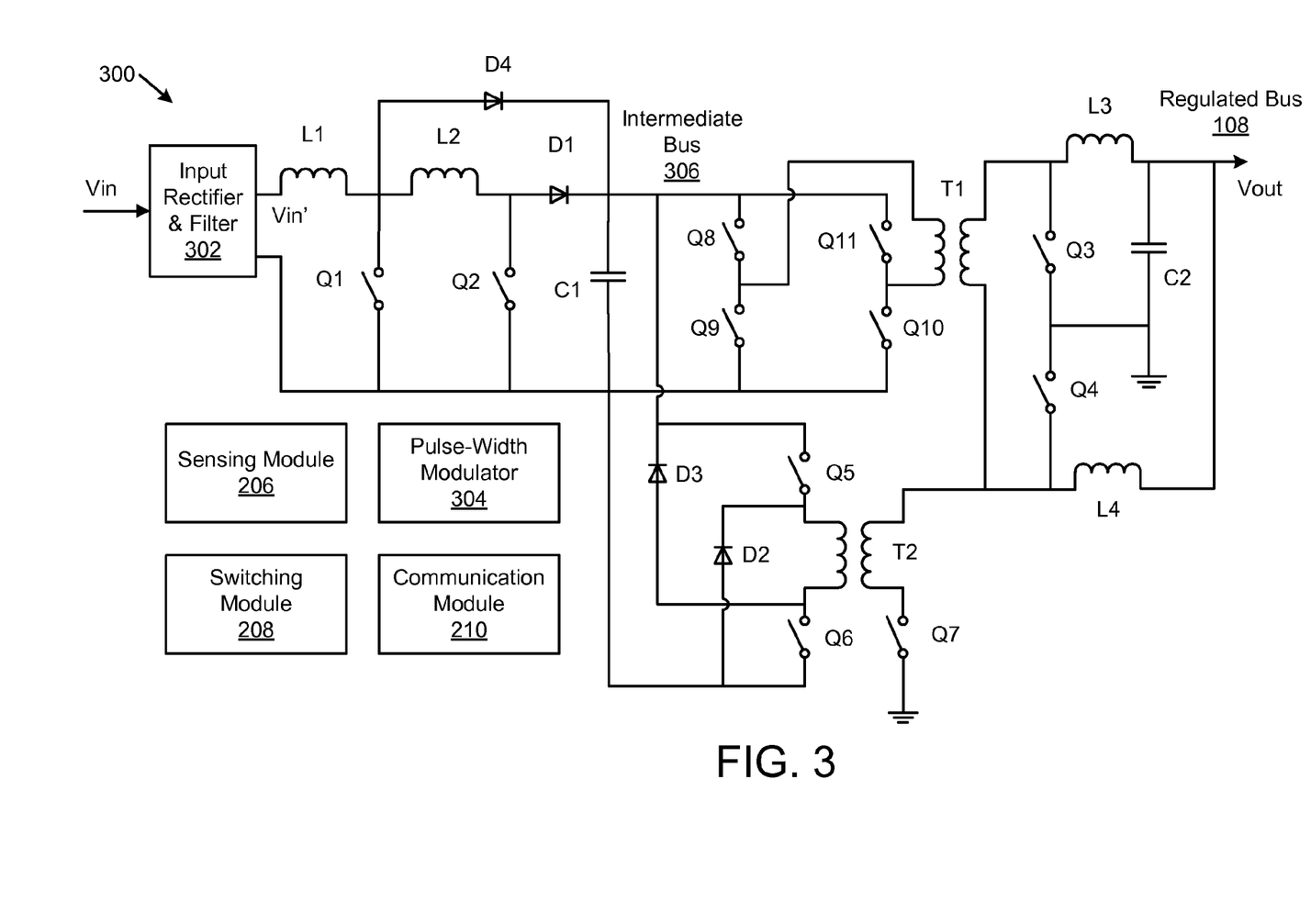
FIG. 3 is an electrical schematic diagram illustrating a specific embodiment of an integrated power supply with apparatus for supplying highly efficient power to a load in both high and low power conditions in accordance with the present invention.

FIG. 3 is an electrical schematic diagram that depicts one specific embodiment of an apparatus 300 to supply efficient power to a load in both high and low power conditions in accordance with the present invention. The apparatus 300 includes an integrated power supply 102 that provides power to a load 106 of the electronic device 104 through a regulated bus 108 as described above in relation to the systems 100, 101 and apparatus 200 of FIGS. 1A, 1B, and 2. The integrated power supply 102 includes a first and a second power supply 202, 204 as described above in relation to the apparatus 200 of FIG. 2. In the embodiment, the apparatus 300 includes a first power supply 202 with two stages and a second power supply 204 with two stages, which are described below. The apparatus 300 also includes a sensing module 206, a switching module 208, and a communication module 210, which are substantially similar to those described above in relation to the apparatus 200 of FIG. 2.

The integrated power supply 102 receives an input AC voltage Vin that is fed to an input rectifier and harmonic filter 302. The input rectifier and harmonic filter 302 rectifies the AC voltage Vin. The input rectifier and harmonic filter 302 may also include an electromagnetic compatibility filter ("EMC") in order to meet industry standards for electromagnetic compatibility as will be recognized by one of ordinary skill in the art.

The integrated power supply 102 includes one or more pulse-width modulators 304 for one or both of the first power supply 202 and the second power supply 204 that regulates a voltage Vout on the regulated bus 108 connected to the first power supply 202 or the second power supply 204. The apparatus 300 also includes one or more pulse-width modulators 304 to regulate voltage on an intermediate bus 306 by controlling a primary stage of the first and second power supplies 202, 204. The one or more pulse-width modulators 304 may be a single unit or multiple units and may be implemented as a processor, field programmable gate array ("FPGA"), discrete logic, or a combination of logic, FPGA, and processors.

In the embodiment, the primary stage of the first and second power supplies 202, 204 are boost converters. In one embodiment, the boost converters are active power factor correction stages that modify current drawn by the integrated power supply 102 so that, in conjunction with EMC filters in the input rectifier and filter stage 302, the boost converters make the integrated power supply 102 substantially appear as a unity power factor load.

When the load 106 draws less power than the minimum power threshold, the boost stage of the second power supply 204 is active. This boost stage of the second power supply 204 includes inductor L1, switch Q1, diode D4, and capacitor C1. The output of the boost stage is the intermediate bus 306 and the pulse-width modulator 304 regulates a duty cycle of the switch Q1 to regulate voltage at the intermediate bus 306 to a level above the rectified input voltage Vin'. The components of the primary stage of the second power supply 204 are sized to handle power up to the minimum power threshold. While the primary stage of the second power supply 204 is operational, switch Q2 is open so inductor L2, switch Q2, and diode D1 do not affect operation of the primary stage of the second power supply 204.

When power consumed by the load 106 rises above the minimum power threshold, the switch Q1 of the primary stage of the second power supply 204 shuts off and the primary stage of the first power supply 202 starts to regulate voltage on the intermediate bus 306. The primary stage of the first power supply 202 includes inductors L1 and L2, diode D1, switch Q2, and capacitor C1. When switch Q1 is off and voltage of the intermediate bus 306 is above the rectified input voltage Vin', diode D4 will be reverse biased and inductors L1 and L2 will act together as a single inductor. Again the components of the primary stage of the first power supply 202, namely L1, L2, D1, Q2, and C1, form a boost converter to regulate voltage on the intermediate bus 306. The components of the primary stage of the first power supply 202 (L1, L2, D1, Q2, and C1) are sized to handle the rated full load power of the intermediate power supply 102. If the components (L1, D4, Q1, C1) of the primary stage of the second power supply 204 are properly sized, the primary stage of the second power supply 204 will be more efficient at power levels below the minimum power threshold than the primary stage of the first power supply 202.

The regulator stage of the first power supply 202 includes switches Q8, Q9, Q10, and Q11, transformer T1, switches Q3 and Q4, inductors L3 and L4, and capacitor C2. Capacitor C2 is connected to the regulated bus 108. When power consumed by the load 106 is above the minimum power threshold, switches Q5, Q6, and Q7 are off so that transformer T2 and diodes D2 and D3 do not affect operation of the integrated power supply 102. The components of the regulator stage of the first power supply 202 (Q3, Q4, Q8, Q9, Q10, Q11, T1, L3, L4, and C2) are sized to handle rated full load power of the integrated power supply.

The regulator stage of the first power supply 202 acts as two interleaved buck-type converters. Switches Q8, Q9, Q10, and Q11 are switched during operation to act like a full-bridge rectifier to connect the intermediate bus 306 across transformer T1 either through switches Q8 and Q10 or through switches Q9 and Q11. When switches Q8 and Q10 are closed, switch Q4 is closed and current in inductor L3 rises. Switches Q8, Q10, and Q4 are opened. Switch Q3 is closed and acts like a free-wheeling diode so that current in inductor L3 starts to decrease.

Switches Q9 and Q11 are then closed to connect the intermediate bus 306 to transformer T1 in an opposite polarity to when switches Q8 and Q10 were closed. Switch Q3 remains closed and current in inductor L4 starts to rise. Switches Q9, Q11, and Q3 are opened and switch Q4 is again closed and acts like a free wheeling diode to allow current in inductor L4 to continue to flow. The current in inductor L4 starts to fall. This action repeats and capacitor C2 is charged to a desired voltage. The pulse-width modulator 304 regulates voltage on the regulated bus 108 by varying a duty cycle. The switches Q8, Q9, Q10, Q11, Q3, and Q4 are switched in sequence based on the duty cycle.

As is known to those of skill in the art, the topology of the regulator stage of the first power supply 202 lends itself to efficient operation at power levels above the minimum power threshold by using zero-voltage switching, switches Q3 and Q4 in place of diodes, etc. However, switching losses tend to dominate at power levels below the minimum power threshold so the regulator stage of the first power supply 202 becomes inefficient below the minimum power threshold.

When the power consumed by the load 106 falls below the minimum power threshold, the regulator stage of the first power supply 202 is shut down by the switching module 208 by opening switches Q8, Q9, Q10, Q11, Q3 and Q4. The regulator stage of the second power supply 204, is a buck-derived, two switch forward topology which is made up of switches Q5, Q6, and Q7, diodes D2 and D3, transformer T2, inductor L4, and capacitor C2. The regulator stage of the second power supply 204 starts up and regulates voltage on the regulated bus 108.

The regulator stage of the second power supply 204 operates by closing switches Q5 and Q6 to connect the intermediate bus 306 across transformer T2. Current then starts to rise in inductor L4. Switch Q7 remains closed and, at an appropriate moment with respect to the duty cycle generated by the pulse-width modulator 304, switches Q5 and Q6 are opened. Current flows through diodes D2 and D3 and current in the inductor L4 starts to decrease. Inductor L4 charges capacitor C2 and the pulse-width modulator 304 varies the duty cycle to regulate voltage on the regulated bus 108.

The components (Q5, Q6, Q7, D2, D3, T2, L4, and C2) of the regulator stage of the second power supply 204 are rated to handle at least power up to the minimum power threshold. As with the primary stage, the regulator stage of the second power supply 204 is designed to be more efficient at power levels below the minimum power threshold than the regulator stage of the first power supply 202. One of skill in the art will recognize other components and topologies of the primary stage and the regulator stage of the second power supply 204 capable of being more efficient at light loads than the primary stage and regulator stage of the first power supply 202.

Figure 4:
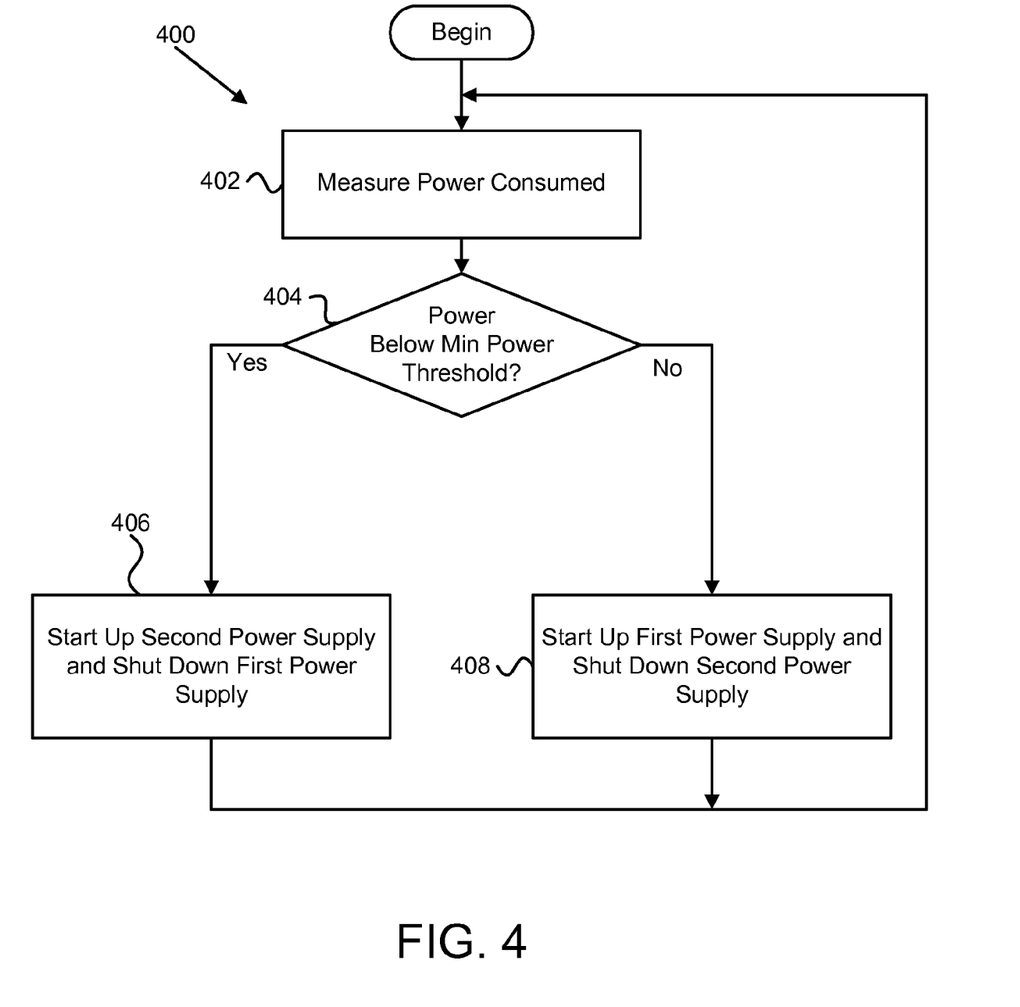
FIG. 4 is a schematic flow chart diagram illustrating one embodiment of a method for supplying highly efficient power to a load in both high and low power conditions in accordance with the present invention.

FIG. 4 is a schematic flow chart diagram illustrating another embodiment of a method 400 for supplying efficient power to a load in both high and low power conditions in accordance with the present invention. The method 400 substantially includes the embodiments and modules described above with regard to the systems 100, 101 and apparatuses 200, 200 depicted in FIGS. 1-3. The method 400 begins and the sensing module 206 senses 402 power consumed at the integrated power supply 102. In one embodiment, the sensing module 206 senses power consumed by the load 108. In another embodiment, the sensing module 206 senses input power to the integrated power supply 102. In another embodiment, the sensing module 206 senses power at another location in the integrated power supply 102.

The switching module 208 determines 404 if power consumed by the load 106 is below the minimum power threshold. If the switching module 208 determines 404 that power measured by the sensing module 206 is below the minimum power threshold, the switching module 208 starts 406 up the second power supply 202 and shuts 406 down the first power supply 204 and then the sensing module 206 resumes sensing 402 power. If the switching module 208 determines 404 that power measured by the sensing module 206 is above the minimum power threshold, the switching module 208 starts 408 up the first power supply 202 and shuts 408 down the second power supply 204 and the sensing module 206 resumes sensing 402 power.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for efficiently regulating voltage, the apparatus comprising:

an integrated power supply that regulates voltage on a regulated bus, the regulated bus providing power to a load, the integrated power supply comprising:

a first power supply providing power to the regulated bus, the first power supply comprising components rated to provide full load power to the load;

a second power supply providing power to the regulated bus, the second power supply comprising switching elements that have lower switching losses than switching elements of the first power supply, the second power supply capable of providing power to the load at a power level below a minimum power threshold, wherein the minimum power threshold comprises a power level above which the first power supply exceeds a minimum allowable efficiency, wherein efficiency comprises a ratio of power delivered to the load divided by power received by the integrated power supply;

a sensing module for measuring power; and a switching module that starts up the second power supply and shuts down the first power supply in response to the measured power falling below the minimum power threshold, and starts up the first power supply and shuts down the second power supply in response to the measured power rising above the minimum power threshold.

2. The apparatus of claim 1, wherein the integrated power supply comprises an internal bus and wherein the first power supply and the second power supply each comprise a primary stage and a regulator stage, wherein, when the first power supply is operational, the primary stage of the first power supply regulates voltage of the internal bus that serves as an input to the regulator stage of the first power supply and the regulator stage of the first power supply regulates the voltage on the regulated bus, and wherein, when the second power supply is operational, the primary stage of the second power supply regulates voltage of the internal bus that serves as an input to the regulator stage of the second power supply and the regulator stage of the second power supply regulates the voltage on the regulated bus.

3. The apparatus of claim 2, wherein the primary stage of the first power supply and of the second power supply each comprise a boost converter that regulates the internal bus to a voltage greater than an input voltage provided to the integrated power supply and the regulator stage of the first power supply and the second power supply each comprise a buck-type converter that regulates the regulated bus to a value lower than the internal bus.

4. The apparatus of claim 1, wherein parasitic capacitance of the switching elements of the second power supply is less than parasitic capacitance of the switching elements of the first power supply.

5. The apparatus of claim 1, wherein the sensing module measures one or more of power consumed by the load and input power to the integrated power supply.

6. The apparatus of claim 1, wherein the minimum allowable efficiency is above 80%.

7. The apparatus of claim 1, wherein the minimum power threshold comprises an upper limit and a lower limit, wherein the switching module starts up the second power supply and shuts down the first power supply in response to the sensing module sensing power supplied to the load falling below the lower limit and wherein the switching module starts up the first power supply and shuts down the second power supply in response to the sensing module sensing power supplied to the load rising above the upper limit.

8. The apparatus of claim 2, wherein the primary stage comprises an active power factor correction stage.

9. The apparatus of claim 4, wherein the parasitic capacitance of the switching elements of the second power supply is at least two thirds less than the parasitic capacitance of the switching elements of the first power supply.

10. A system to efficiently regulate voltage, the system comprising:
an integrated power supply that regulates voltage on a regulated bus, the regulated bus providing power to a load, the integrated power supply comprising:
a first power supply with components rated to provide full load power to the load; and
a second power supply with switching elements that have lower switching losses than switching elements of the first power supply when the second power supply provides power to the load at a power level below a minimum power threshold, wherein the minimum power threshold comprises a power level above which the first power supply exceeds a minimum allowable efficiency, wherein efficiency comprises a ratio of power delivered to the load divided by power received by the integrated power supply;
a sensing module for measuring power at the integrated power supply; and
a switching module which starts up the second power supply and shuts down the first power supply when the measured power falls below the minimum power threshold, and starts up the first power supply and shuts down the second power supply when the measured power rises above the minimum power threshold;
an electronic device comprising the load; and
the regulated bus being connected between the electronic device and the integrated power supply, wherein the regulated bus delivers power from the integrated power supply to the electronic device.

11. The system of claim 10, wherein the power supplies of the integrated power supply each comprise a primary stage and a regulator stage, wherein, when the first power supply is operational, the primary stage of the first power supply regulates voltage of the internal bus that serves as an input to the regulator stage of the first power supply and the regulator stage of the first power supply regulates the voltage on the regulated bus, and wherein, when the second power supply is operational, the primary stage of the second power supply regulates voltage of the internal bus that serves as an input to the regulator stage of the second power supply and the regulator stage of the second power supply regulates the voltage on the regulated bus.

12. The system of claim 10, further comprising a communication bus and a communication module wherein the communication module communicates over the communication bus whether the first power supply or the second power supply is active and the amount of power consumed by the load.

13. The system of claim 10, wherein in the integrated power supply comprises a plurality of electronic devices connected to the regulated bus.

14. The system of claim 10, wherein the integrated power supply receives alternating current ("AC") voltage as an input and provides regulated direct current ("DC") voltage as an output.

15. The system of claim 10, wherein the electrical device comprises one of a personal computer, a laptop computer, a workstation, an appliance, an application-specific integrated circuit ("ASIC"), a Personal Digital Assistant ("PDA"), a digital music player, and a server.

16. The system of claim 10, wherein the primary stage comprises a boost converter that regulates the internal bus to a voltage greater than an input voltage provided to the boost stage and the regulator stage comprises a buck converter that regulates the regulated bus to a value lower than the internal bus.

17. A computer program product comprising a computer readable medium having computer usable program code stored on a tangible medium and executable on a processor to perform operations for efficiently regulating voltage, the operations of the product comprising:
measuring power consumed by a load supplied by an integrated power supply that regulates voltage on a regulated bus, the integrated power supply comprising:
a first power supply connected to the regulated bus, the first power supply comprising components rated to provide full load power to the load; and
a second power supply connected to the regulated bus, the second power supply comprising switching elements that have lower switching losses than switching elements of the first power supply, the second power supply capable of providing power to the load at a power level below a minimum power threshold, wherein the minimum power threshold comprises a power level above which the first power supply exceeds a minimum allowable efficiency, wherein efficiency comprises a ratio of power delivered to the load divided by power received by the integrated power supply;

starting up the second power supply and shutting down the first power supply in response to the measured power falling below the minimum power threshold; and starting up the first power supply and shutting down the second power supply in response to the measured power rising above the minimum power threshold.

* * * * *